United States Patent [19]

Minohara

[11] Patent Number: 6,077,622

[45] Date of Patent: Jun. 20, 2000

[54] RECYCLING METHOD OF NICKEL-HYDROGEN SECONDARY BATTERY

[75] Inventor: Taketoshi Minohara, Toyota, Japan

[73] Assignee: Toyota Jidosha Kabushiki Kaisha, Toyota, Japan

[21] Appl. No.: 09/158,786

[22] Filed: Sep. 23, 1998

[30] Foreign Application Priority Data

Sep. 25, 1997 [JP] Japan .................................... 9-260288

[51] Int. Cl.$^7$ ...................................................... H01M 2/36
[52] U.S. Cl. .................................. 429/95; 429/52; 429/49
[58] Field of Search .................................. 429/49, 52, 95

[56] References Cited

U.S. PATENT DOCUMENTS

| 312,340 | 2/1885 | Dun | 429/80 |
|---|---|---|---|
| 1,488,480 | 4/1924 | Edison | 429/49 |

FOREIGN PATENT DOCUMENTS

| 53-43842 | 4/1978 | Japan . |
|---|---|---|
| 57-9075 | 1/1982 | Japan . |
| 5-135797 | 6/1993 | Japan . |
| 7-335276 | 12/1995 | Japan . |
| 8-115752 | 5/1996 | Japan . |

*Primary Examiner*—Maria Nuzzolillo
*Assistant Examiner*—Angela J. Martin
*Attorney, Agent, or Firm*—Oblon, Spivak, McClelland, Maier & Neustadt, P.C.

[57] ABSTRACT

A method of recycling a deteriorated nickel-hydrogen battery. Concentrated sulfuric acid containing at least one of Ni ions, Co ions and La ions is poured into the deteriorated nickel-hydrogen battery and the interior thereof is cleaned with the concentrated sulfuric acid. The state of the interior of the battery is maintained at a temperature of 60±10° C., and an electric current is supplied in such a direction as to charge the nickel-hydrogen battery. Then, the interior of the nickel-hydrogen battery is cleaned and filled with an alkali electrolyte containing a reducing agent. Consequently, γ-NiOOH changes to β-NiOOH to restore the capacity of a positive electrode, and $Mm(OH)_3$, $Al(OH)_3$, $Mn(OH)_2$ and $CO(OH)_2$ dissolve in concentrated sulfuric acid to activate the surface of a negative electrode. In addition, the hydrophilic property of the separator is restored.

14 Claims, No Drawings

RECYCLING METHOD OF NICKEL-HYDROGEN SECONDARY BATTERY

BACKGROUND OF THE INVENTION

1. Field of the Invention

The present invention relates to a method of recycling a nickel-hydrogen secondary battery.

2. Description of Related Art

The nickel-hydrogen secondary battery has features of a great energy density and high energy efficiency. The nickel-hydrogen secondary battery also has features that, since the reaction therein is a simple reaction of hydrogen ions moving between active materials upon charging and discharging thereof, the battery can be sealed by controlling the charging and discharging conditions, and a sufficiently long cycle life can be obtained.

In this nickel-hydrogen secondary battery, nickel hydroxide is used as the active material of a positive electrode while a negative electrode is made of a hydrogen-occuludable alloy capable of occuluding hydrogen as the active material of the negative electrode. In addition, to improve the utilization rate of the active material of the positive electrode, cobalt oxide is also included. And an aqueous alkali solution is used as the electrolyte. With this battery, charging and discharging are performed by the following reactions.

positive electrode:

$\beta\text{-Ni(OH)}_2 + OH^- \rightarrow \beta\text{-NiOOH} + H_2O + e^-$ (charging)

negative electrode:

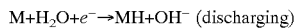
$M + H_2O + e^- \rightarrow MH + OH^-$ (discharging)

The separator which separates the positive electrode and negative electrode from each other is made of polypropylene or the like which is stable in alkali. Polypropylene is, however, low in hydrophilic property, so that the battery performance cannot be sufficiently achieved. To overcome this problem, sulfone groups as hydrophilic groups are chemically fixed to the surface of polypropylene fibers so that the separator of polypropylene nonwoven fabric exhibits high hydrophilic property and is stable in alkali.

The nickel-hydrogen secondary battery has excellent features such as being maintenance-free because of it's sealed arrangement, and long life times. However, it has become clear that where the nickel-hydrogen secondary battery is used in severe conditions such as high temperature atmosphere, or over-charging or over-discharging with a high electric current, deterioration as follows occurs. In the positive electrode, for example, the above normal charging and discharging cycle is not performed, and $K^+$ ions, $Na^+$ ions and the like are captured by the positive electrode to generate $\gamma\text{-NiOOH}$. Consequently, the capacity of the positive electrode is reduced. In the negative electrode, $MmNi_{5-x-y-z}Al_xMn_yCo_z$ (Mm:misch metal) or the like as the hydrogen-occuludable alloy dissolves to generate $Mm(OH)_3$, and Al, Mn and Co also dissolve and then deposit as $Al(OH)_3$, $Mn(OH)_2$ and $CO(OH)_2$ on the surface of the negative electrode, which results in the surface of the negative electrode becoming inert. These deposits are also captured by crystals of the positive electrode active material which lowers the capacity thereof.

Furthermore, Mn ions resulting from the deterioration of the negative electrode, and oxygen radicals resulting from the battery reaction may act on the separator to break chains in molecules to drop the hydrophilic groups therefrom. In this case, the hydrophilic property of the separator decreases with the result that battery performance decreases.

Due to these reactions, the electrolyte is fixed (dried up), which makes charging and discharging difficult. ("fixing" indicates the phenomena such as change of $OH^-$ ions in the electrolyte into $Mm(OH)_3$, or capture of $K^+$ ions by the positive electrode.

Conventionally, there is no method by which nickel-hydrogen secondary batteries which have deteriorated can be recycled so that they have been discarded, or disassembled to recycle parts or materials.

Cobalt which is used in the nickel-hydrogen secondary battery, is short as natural resources, and misch metal (Mm) used in the negative electrode is expensive. Consequently, it is very desirable to reuse nickel-hydrogen secondary batteries, which has deteriorated, by regenerating them so that they are capable of charging and discharging properly.

SUMMARY OF THE INVENTION

It is an object of the present invention to provide a method capable of recycling deteriorated secondary nickel-hydrogen secondary batteries which have.

In a first aspect of the recycling method of a nickel-hydrogen battery in accordance with the present invention, at least one of the step ($A_1$) of pouring a new alkali electrolyte into a nickel-hydrogen battery and the step ($A_2$) of exhausting a liquid in a nickel-hydrogen battery and pouring a new alkali electrolyte thereinto, is performed.

In a second aspect of the recycling method of a nickel-hydrogen battery in accordance with the present invention, at least one of the step ($B_1$) of pouring concentrated sulfuric acid which contains at least one of nickel ions, cobalt ions and lanthanum ions into a nickel-hydrogen battery to clean the interior thereof at normal temperature and the step ($B_2$) of pouring concentrated sulfuric acid which contains at least one of nickel ions, cobalt ions and lanthanum ions into a nickel-hydrogen battery and maintaining the state of the battery at a temperature of 60±10° C., is performed. Then, at least one of the step ($A_1$) of pouring a new alkali electrolyte into the nickel-hydrogen battery and the step ($A_2$) of exhausting a liquid in the nickel-hydrogen battery and pouring a new alkali electrolyte thereinto, is performed.

In a third aspect of the recycling method of a nickel-hydrogen battery in accordance with the present invention, at least one of the step ($B_1$) of pouring concentrated sulfuric acid which contains at least one of nickel ions, cobalt ions and lanthanum ions into a nickel-hydrogen battery to clean the interior thereof at normal temperature and the step ($B_2$) of pouring concentrated sulfuric acid which contains at least one of nickel ions, cobalt ions and lanthanum ions into a nickel-hydrogen battery and maintaining the state of the battery at a temperature of 60±10° C. is performed. Then, the step (C) of supplying an electric current in such a direction as to charge the nickel-hydrogen battery (charging direction) is performed, and at least one of the step ($A_1$) of pouring a new alkali electrolyte into the nickel-hydrogen battery and the step ($A_2$) of exhausting a liquid in the nickel-hydrogen battery and pouring a new alkali electrolyte thereinto, is performed.

With the first aspect of the recycling method, at least one of the step ($A_1$) of pouring a new alkali electrolyte into a nickel-hydrogen battery and the step ($A_2$) of exhausting a liquid in the nickel-hydrogen battery and pouring a new alkali electrolyte thereinto, is performed.

Examples of the new alkali electrolyte include an aqueous solution of potassium hydroxide, aqueous solution of sodium hydroxide, and aqueous solution of a mixture of potassium hydroxide and sodium hydroxide. It is preferable to use the alkali electrolyte having the composition and density similar to those of the electrolyte used in the nickel-hydrogen battery to be recycled. For example, an alkali electrolyte containing 4 to 5 moles/L of potassium hydroxide and 2 to 3 moles/L of sodium hydroxide can be used.

As a result of battery use, which is accompanied by deterioration of the battery, $K^+$ or $Na^+$ ions become captured by the positive electrode which results in diminished supply of these ions in the electrolyte. However, by performing step $(A_1)$ in which fresh alkali electrolyte containing $K^+$ or $Na^+$ is poured into the electrolyte of the battery the nickel-hydrogen battery is regenerated and recycled as a high-power nickel-hydrogen battery having a small internal resistance. In addition, in the vicinity of the positive electrode, the following reactions occur, and $Ni(OH)_2$ and $Co(OH)_2$ which could act as active materials are formed on the surface of the active material, which results in the capacity of the positive electrode being restored.

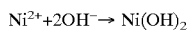

$$Ni^{2+} + 2OH^- \rightarrow Ni(OH)_2$$

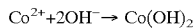

$$Co^{2+} + 2OH^- \rightarrow Co(OH)_2$$

The step $(A_1)$ includes adding a new alkali electrolyte to the liquid which already exists in the battery, or adding a new alkali electrolyte to the battery in which almost no liquid remains because the used alkali electrolyte is fixed.

By performing the step $(A_2)$ of exhausting the electrolyte in the nickel-hydrogen battery, and pouring a new electrolyte thereinto, impurities such as aluminum ions, cobalt ions, or manganese ions, which dissolve from the hydrogen-occuludable alloy, are removed. Consequently, deposition of $Al(OH)_3$, $Mn(OH)_2$ and $CO(OH)_2$ on the surface of the positive electrode is restrained to prevent lowering in capacity of the positive electrode. In addition, $K^+$ ions or $Na^+$ ions can be supplied, similarly to the step $(A_1)$, to enable deteriorated batteries to be regenerated and recycled to high-powered batteries whose internal resistance is small.

The electrolyte which is exhausted in step $(A_2)$ may be either the old electrolyte inside the deteriorated battery or the new electrolyte added in step $(A_1)$. Since it is preferable to perform the addition of step $(A_1)$ and step $(A_2)$ continuously, the new electrolyte in the step $(A_1)$ is preferred.

In the step $(A_1)$ and step $(A_2)$, it is preferable to add a reducing agent to the new alkali electrolyte. The reducing agent reduces metal ions within the electrolyte, such as $Ni^{2+}$ $Co^{2+}$, and $La^{2+}$ or $Mn^{2+}$, to deposit on the surface of the positive electrode and negative electrode as metals so that the conductivities thereof are improved. It can be considered that Ni and Co on the surfaces of the positive electrode and negative electrode act as catalysts in this reaction. The reducing agent also acts to restrain the dissolution of the hydrogen-occuludable alloy in the electrolyte. Consequently, further lowering in capacity of the positive electrode, which is caused by the deposition of hydroxide of metal, is prevented.

Examples of the reducing agent include sodium borohydride, potassium borohydride, sodium hypophosphite, and potassium hypophosphite. The preferred amount of sodium borohydride or potassium borohydride in the electrolyte is 0.01 to 0.3 moles/L, and the preferred amount of sodium hypophosphite or potassium hypophosphite is 0.01 to 0.2 moles/L. If the amount of reducing agent is too great, the recycling cost is increased, and various problems such as an increase of internal pressure due to generation of hydrogen gas occur.

With the second aspect of the recycling method, first, at least one of the step $(B_1)$ of pouring concentrated sulfuric acid which contains at least one of Ni ions, Co ions and La ions into a nickel-hydrogen battery to clean the interior thereof at normal temperature, and the step $(B_2)$ of pouring concentrated sulfuric acid which contains at least one of Ni ions, Co ions and La ions into a nickel-hydrogen battery and maintaining the state of the battery at a temperature of 60±10° C., is performed.

In the step $(B_1)$ of pouring concentrated sulfuric acid which contains at least one of Ni ions, Co ions and La ions to clean the interior of the battery at normal temperature, metal ions such as $k^+$ ions or $Na^+$ ions dissolve from the active material of the positive electrode, which is in the form of $\gamma$-NiOOH. Consequently, $\gamma$-NiOOH changes to $\beta$-NiOOH, which results in the capacity of the positive electrode being restored. The metal ions dissolved are removed by cleaning operation.

By pouring concentrated sulfuric acid, $Mm(OH)_3$, $Al(OH)_3$, $Mn(OH)_2$ and $CO(OH)_2$ which have deposited on the surface of the negative electrode and have been captured by the crystals of the active material of the positive electrode, these hydroxides dissolve in concentrated sulfuric acid. Consequently, the surface of the negative electrode is activated, and the capacity of the positive electrode increases, because there is no deposition of the metal hydride on the surface of the positive electrode.

By cleaning the interior of the battery with concentrated sulfuric acid, sulfone groups which have been severed from the separator are washed off and removed. Thus, the internal resistance can be effectively restrained.

In the above reaction, concentrated sulfuric acid includes at least one of Ni ions, Co ions and La ions to restrain the dissolution of at least one of Ni and Co of the positive electrode, and La of the negative electrode. Accordingly, it is preferable to increase the concentration of Ni ions, Co ions and La ions in concentrated sulfuric acid as high as possible, and more preferably, to a saturation concentration thereof.

To achieve the above-described operation of concentrated sulfuric acid effectively, it is preferable to perform cleaning with concentrated sulfuric acid at least three times. Instead of concentrated sulfuric acid, concentrated nitric acid will do. But, if nitrate ions remain after cleaning, the self-discharging property of the regenerated battery is lowered. So, it is preferable to use concentrated sulfuric acid.

Furthermore, by performing the step $(B_2)$ of pouring concentrated sulfuric acid which contains at least one of Ni ions, Co ions and La ions into a nickel-hydrogen battery and maintaining the state of the battery at a temperature of 60±10° C., new sulfone groups can be formed on the surface of the separator. Thus, the above-described operation of the step $(B_1)$ is achieved, and the hydrophilic property of the separator is restored.

If the temperature in the step $(B_2)$ is lower than 50° C., it is difficult to form new sulfone groups on the surface of the separator. And if the temperature is higher than 70° C., the electrodes start to corrode, which is undesirable. The most preferred temperature range is 60±3° C. The preferred time for maintaining the battery at such a temperature is at least 30 minutes, and more preferably, at least 60 minutes. If less than 30 minutes, the amount of sulfone groups to be formed on the surface of the separator is too small to exhibit the hydrophilic property.

In the second aspect of the present invention, after performing at least one of the step $(B_1)$ and step $(B_2)$ at least one of the step ($A_1$) of pouring a new alkali electrolyte into a nickel-hydrogen battery and the step ($A_2$) of exhausting an electrolyte in a nickel-hydrogen battery and pouring a new alkali electrolyte thereinto, is performed. Thus, the sulfuric acid is neutralized and removed. Thus, with the method of the second aspect, operational advantages similar to those of the method of the first aspect can be achieved.

With a third aspect of the recycling method of a nickel-hydrogen battery in accordance with the present invention, first, the treatment with concentrated sulfuric acid, which is at least one of the step ($B_1$) and step ($B_2$), similarly to the second aspect of the recycling method of the present invention, is performed. The operational advantages of this treatment are similar to those of the method of the second aspect.

After performing at least one of the step ($B_1$) and step ($B_2$), the step (C) of supplying an electric current in such a direction as to charge the nickel-hydrogen battery (charging direction) is performed. This results in Ni ions, Co ions and La ions in concentrated sulfuric acid moving toward the negative electrode. In addition, Al ions and Mn ions dissolved in the concentrated sulfuric acid move toward the negative electrode.

Consequently, Ni ions, Co ions, La ions and Mn ions deposit as metal on the negative electrode by the following reaction:

$$M^{x+} + xe^- \rightarrow M$$

The metal deposited serves as a catalyst and forms an electrically conducting network. Thus, the reactivity of the hydrogen-occuludable alloy of the negative electrode is improved.

The preferred current density in the step (C) ranges from 3 to 5 $A/dm^2$. If less than 3 $A/dm^2$, the above-described reaction does not occur, and if greater than 5 $A/dm^2$, beard-like deposition of metal may be generated. The preferred time for applying an electric current is 30 to 60 minutes. If less than 30 minutes, the above-described reaction is insufficient, and if greater than 60 minutes, the composition of the resulting positive electrode may differ from a prescribed one.

In the recycling method of the third aspect, after the step (C), at least one of the step ($A_1$) and step ($A_2$) which are respectively similar to those of the method of the first aspect is performed. With this method, operational advantages similar to those of the first aspect can be achieved.

By performing at least one of the step ($A_1$) and step ($A_2$) the following reactions occur in the vicinity of the positive electrode, similarly to the method of the first aspect, to form $Ni(OH)_2$ and $Co(OH)_2$ which could serve as active materials on the surface of the active material of the positive electrode. This results in the capacity of the positive electrode being restored.

$$Ni^{2+} + 2OH^- \rightarrow Ni(OH)_2$$

$$Co^{2+} + 2OH^- \rightarrow Co(OH)_2$$

In the vicinity of the negative electrode, Ni ions and Co ions deposit as metal on the negative electrode by the following reaction:

$$M^{x+} + xe^- \rightarrow M$$

Consequently, the concentrations of Ni ions and Co ions are respectively decreased so that $Ni(OH)_2$ and $CO(OH)_2$ are scarcely formed to prevent the lowering in activity caused by the deposition thereof.

In summary, with the recycling method of the nickel-hydrogen battery in accordance with the present invention, the charging and discharging property of the deteriorated nickel-hydrogen battery can be restored, and consequently, the deteriorated nickel-hydrogen battery can be used again, which contributes to the saving of the natural resources of the earth, and reduces the production cost of the overall nickel-hydrogen battery.

Hereinafter, the present invention will be explained in detail based on several embodiments.

Embodiment 1:

The present embodiment is based on the third aspect of the present invention.

First, a nickel-hydrogen battery having a battery capacity of 95,000 mAh, internal resistance of 6.5 mΩ, and volume of 490 $cm^3$ was prepared. The positive electrode was prepared by applying an active material composed of nickel hydroxide powder and metal cobalt powder to a substrate of foamed nickel, the negative electrode was a substrate of hydrogen-occuludable alloy composed of Mm $Ni_{5-x-y-z}Al_xMn_yCo_2$, and the separator was prepared by introducing sulfone groups in a polypropylene nonwoven fabric.

The nickel-hydrogen battery thus prepared was charged with a constant current of 3C and discharged with a constant current of 3C (hereinafter will be called 3C—3C) at room temperature. This cycle of charging and discharging was repeated to deteriorate the battery. The capacity of the deteriorated battery was 74,500 mAh, and the internal resistance thereof was 10.2 mΩ, Hereinafter, the battery which has deteriorated is described as a "deteriorated battery".

(1) Step ($B_1$)

First, metal nickel was dissolved in concentrated sulfuric acid such that Ni ions were included therein to a saturation concentration. Next, cobalt sulfate was dissolved such that Co ions were included to a saturation concentration. Thus, a concentrated sulfuric acid solution was prepared. Then, the operation of replacing an electrolyte in the deteriorated battery with the concentrated sulfuric acid solution thus prepared was repeated five times at normal temperature to clean the interior of the deteriorated battery with the concentrated sulfuric acid solution. Then, the interior of the deteriorated battery was filled therewith.

(2) Step ($B_2$)

Next, the deteriorated battery filled with the concentrated sulfuric acid solution was heated to 60° C. and kept at this temperature for 60 minutes.

(3) Step (C)

The deteriorated battery was allowed to cool to normal temperature. Then, an electric current was supplied to the deteriorated battery with a current density of 3 to 5 $A/dm^2$ in the charging direction for 30 minutes.

(4) Step ($A_1$)

Then, the concentrated sulfuric acid solution in the deteriorated battery was exhausted, and the interior of the deteriorated battery was replaced with a new alkali electrolyte composed of 4.25 moles/L of potassium hydroxide, 2.75 moles/L of sodium hydroxide, and 0.24 moles/L of potassium hypophosphite as a reducing agent three times to clean the interior of the deteriorated battery with the new alkali electrolyte.

(5) Step ($A_2$)

Next, the interior of the deteriorated battery was filled with the above new alkali electrolyte and sealed, thus obtaining a regenerated battery.

As shown in TABLE 1, the battery performance of the regenerated battery was 92,000 mAh in battery capacity and 6.6 mΩ in internal resistance, which were respectively close to the initial performance. Thus, the battery performance was sufficiently regenerated and restored. The capacity regeneration rate was 23.5%. The capacity regeneration rate is the rate of the restored battery capacity obtained by subtracting the deteriorated battery capacity from that of the regenerated battery to the deteriorated battery capacity.

Capacity regeneration rate=100 X (regenerated battery capacity-deteriorated battery capacity)/deteriorated battery capacity Embodiment 2:

A nickel-hydrogen battery similar to that of Embodiment 1 was repeatedly charged and discharged with 1C—1C at room temperature to deteriorate the battery. The capacity of the battery thus deteriorated was 10,000 mAh, and the internal resistance thereof was 53.2 mΩ.

Then, the treatment identical to that of Embodiment 1 was performed, thereby obtaining a regenerated battery. As shown in TABLE 1, the battery performance of the obtained battery was 82,000 mAh in battery capacity and 9.2 mΩ in internal resistance, which were respectively close to the initial performance. Thus, the battery performance was sufficiently regenerated and restored. The capacity regeneration rate was 720%.

Embodiment 3:

A nickel-hydrogen battery which was similar to that of Embodiment 1 except that the battery capacity was 7,000 mAh, internal resistance was 3.0 mΩ, and volume was 350 cm$^3$ was prepared. The battery thus prepared was repeatedly charged and discharged with 1C—1C at room temperature to deteriorate the battery. The capacity of the battery deteriorated was 6,800 mAh, and the internal resistance thereof was 10.5 mΩ.

Then, the deteriorated battery was subjected to the treatment identical to that of Embodiment 1, thereby obtaining a regenerated battery. As shown in TABLE 1, the battery performance of the obtained regenerated battery was 6,820 mAh in battery capacity and 3.2 mΩ in internal resistance, which were respectively close to the initial performance. Thus, the battery performance was sufficiently regenerated and restored. The capacity regeneration rate was 0.3%.

Embodiment 4:

A nickel-hydrogen battery similar to that of Embodiment 3 was repeatedly charged and discharged with 1C—1C at room temperature to deteriorate the battery. The capacity of the deteriorated battery was 6,950 mAh, and the internal resistance thereof was 12.1 mΩ.

Then, the deteriorated battery was subjected to the treatment identical to that of Embodiment 1, thereby obtaining a regenerated battery. As shown in TABLE 1, the battery performance of the obtained battery was 6,950 mAh in battery capacity and 3.3 mΩ in internal resistance, which were respectively close to the initial performance. Thus, the battery performance was sufficiently regenerated and restored. The capacity regeneration rate was 0%.

Embodiment 5:

A nickel-hydrogen battery which was similar to that of Embodiment 1 except that the battery capacity was 4,500 mAh, internal resistance was 8.5 mΩ, and volume was 48 cm$^3$ was prepared. The battery thus prepared was repeatedly charged and discharged with 3C—3C at room temperature to deteriorate the battery. The capacity of the battery deteriorated was 2,200 mAh, and the internal resistance thereof was 18.2mΩ.

Then, the deteriorated battery was subjected to the treatment identical to that of Embodiment 1, thereby obtaining a regenerated battery. As shown in TABLE 1, the battery performance of the obtained battery was 4,200 mAh in battery capacity and 8.6 mΩ in internal resistance, which were respectively close to the initial performance. Thus, the battery performance was sufficiently regenerated and restored, The capacity regeneration rate was 90.1%.

Embodiment 6:

A nickel-hydrogen battery which was similar to that of Embodiment 1 except that the battery capacity was 2,300 mAh, internal resistance was 6.0 mΩ and volume was 25 cm$^3$ was prepared. The battery thus prepared was repeatedly charged and discharged with 1C—1C at room temperature to deteriorate the battery. The capacity of the deteriorated battery was 890 mAh, and the internal resistance thereof was 45.0 mΩ.

Then, the deteriorated battery was subjected to the treatment identical to that of Embodiment 1, thereby obtaining a regenerated battery. As shown in TABLE 1, the battery performance of the obtained battery was 2,010 mAh in battery capacity and 6.1 mΩ in internal resistance, which were respectively close to the initial performance. Thus, the battery performance was sufficiently regenerated and restored. The capacity regeneration rate was 125.8%.

Embodiment 7:

A nickel-hydrogen battery which was similar to that of Embodiment 1 except that the battery capacity was 1,100 mAh, internal resistance was 8.2 mΩ, and volume was 20 cm$^3$ was prepared. The battery thus prepared was repeatedly charged and discharged with 1C—1C at 60° C. to deteriorate the battery. The battery capacity of the deteriorated battery was 0 mAh, and the internal resistance thereof was infinity mΩ.

Then, the deteriorated battery was subjected to the treatment identical to that of Embodiment 1, thereby obtaining a regenerated battery. As shown in TABLE 1, the battery performance of the obtained battery was 950 mAh in battery capacity and 9.2 mΩ in internal resistance, which were respectively close to the initial performance. Thus, the battery performance was sufficiently regenerated and restored. The capacity regeneration rate was infinity %.

Embodiment 8:

A nickel-hydrogen battery similar to that of Embodiment 1 was repeatedly charged and discharged with 1C—1C at 50° C. to deteriorate the battery. The capacity of the deteriorated battery was 12,000 mAh, and the internal resistance thereof was 112.5 mΩ.

Then, the deteriorated battery was subjected to the treatment which was identical to that of Embodiment 1 except that the alkali electrolyte in the step ($A_2$) did not contain sodium hypophosphite nor sodium borohydride, thereby obtaining a regenerated battery. As shown in TABLE 1, the battery performance of the obtained battery was 85,300 mAh in battery capacity and 10.2 mΩ in internal resistance, which were respectively close to the initial performance. Thus,the battery performance was sufficiently regenerated and restored. The capacity regeneration rate was 610.8%.

Embodiment 9:

A nickel-hydrogen battery similar to that of Embodiment 1 was repeatedly charged and discharged with 1C—1C at 50° C. to deteriorate the battery. The capacity of the deteriorated battery was 59,300 mAh, and the internal resistance thereof was 23.3 mΩ.

Then, the deteriorated battery was subjected to the treatment which was identical to that of Embodiment 1 except that the alkali electrolyte in the step ($A_2$) contained 0.3 moles/L of sodium borohydride in place of sodium hypophosphite, thereby obtaining a regenerated battery. As shown in TABLE 1, the battery performance of the obtained regenerated battery was 78,500 mAh in battery capacity and 10.2 mΩ in internal resistance, which were respectively close to the initial performance. Thus, the battery performance was sufficiently regenerated and restored. The capacity regeneration rate was 32.4%.

Embodiment 10:

A nickel-hydrogen battery similar to that of Embodiment 3 was repeatedly charged and discharged with 1C—1C at room temperature to deteriorate the battery. The capacity of the deteriorated battery was 5,800 mAh, and the internal resistance thereof was 102.4 mΩ.

Then, the deteriorated battery was subjected to the treatment which was identical to that of Embodiment 1 except that the alkali electrolyte in the step ($A_2$) was identical to that of Embodiment 9, thereby obtaining a regenerated battery. As shown in TABLE 1, the battery performance of the obtained battery was 6,530 mAh in battery capacity and 4.5 mΩ in internal resistance, which were respectively close to the initial performance. Thus, the battery performance was sufficiently regenerated and restored. The capacity regeneration rate was 12.6%.

Embodiment 11:

A nickel-hydrogen battery similar to that of Embodiment 3 was repeatedly charged and discharged with 1C—1C at room temperature to deteriorated the battery. The capacity of the deteriorated battery was 5,920 mAh, and the internal resistance thereof was 114.3 mΩ.

Then, the deteriorated battery was subjected to the treatment which was identical to that of Embodiment 1 except that neither the step ($B_2$) nor step ($A_1$) was performed, thereby obtaining a regenerated battery. As shown in TABLE 1, the battery performance of the obtained regenerated battery was 6,580 mAh in battery capacity and 4.4 mΩ in internal resistance, which were respectively close to the initial performance. Thus, the battery performance was sufficiently regenerated and restored. The capacity regeneration rate was 11.1%.

Embodiment 12:

A nickel-hydrogen battery similar to that of Embodiment 5 was repeatedly charged and discharged with 1C—1C at room temperature to deteriorate the battery. The capacity of the deteriorated battery was 1,238 mAh, and the internal resistance thereof was 145.4 mΩ.

Then, the deteriorated battery was subjected to the treatment which was identical to that of Embodiment 1 except that neither the step ($B_2$) nor step ($A_1$) was performed, thereby obtaining a regenerated battery. As shown in TABLE 1, the battery performance of the obtained regenerated battery was 4,200 mAh in battery capacity and 10.2 mΩ in internal resistance, which were respectively close to the initial performance. Thus, the battery performance was sufficiently regenerated and restored, The capacity regeneration rate was 239.6%.

Embodiment 13:

A nickel-hydrogen battery similar to that of Embodiment 1 was repeatedly charged and discharged with 1C—1C at room temperature to deteriorate the battery. The capacity of the deteriorated battery was 45,000 mAh, and the internal resistance thereof was 98.4 mΩ.

Then, the deteriorated battery was subjected to the treatment which was identical to that of Embodiment 1 except that no step ($B_1$) was performed, thereby obtaining a regenerated battery. As shown in TABLE 1, the battery performance of the obtained regenerated battery was 87,000 mAh in battery capacity and 15.2 mΩ in internal resistance, which were respectively close to the initial performance. Thus, the battery performance was sufficiently regenerated and restored, The capacity regeneration rate was 93.3%.

Embodiment 14:

A nickel-hydrogen battery similar to that of Embodiment 1 was repeatedly charged and discharged with 1C—1C at room temperature to deteriorate the battery. The capacity of the deteriorated battery was 42,000 mAh, and the internal resistance thereof was 157.3 mΩ.

Then, the deteriorated battery was subjected to the treatment which was identical to that of Embodiment 1 except that only the step ($B_1$) and step ($A_2$) were performed, thereby obtaining a regenerated battery. As shown in TABLE 1, the battery performance of the obtained battery was 65,000 mAh in battery capacity and 12.3 mΩ in internal resistance, which were respectively close to the initial performance. Thus, the battery performance was sufficiently regenerated and restored. The capacity regeneration rate was 54.8%.

Embodiment 15:

A nickel-hydrogen battery similar to that of Embodiment 1 was repeatedly charged and discharged with 1C—1C at room temperature to deteriorate the battery. The capacity of the deteriorated battery was 75,000 mAh, and the internal resistance thereof was 15.3 mΩ.

Then, the deteriorated battery was subjected to the treatment which was identical to that of Embodiment 1 except that only the step ($B_1$) and step ($A_2$) were performed, thereby obtaining a regenerated battery. As shown in TABLE 1, the battery performance of the obtained battery was 89,000 mAh in battery capacity and 7.2 mΩ in internal resistance, which were respectively close to the initial performance. Thus, the battery performance was sufficiently regenerated and restored. The capacity regeneration rate was 18.7%.

Embodiment 16:

A nickel-hydrogen battery similar to that of Embodiment 1 was repeatedly charged and discharged with 1C—1C at room temperature to deteriorate the battery. The capacity of the deteriorated battery was 0 mAh, and the internal resistance thereof was infinity mΩ.

Then, the deteriorated battery was subjected to the treatment which was identical to that of Embodiment 1 except that only the step ($B_2$) and step ($A_2$) were performed, thereby obtaining a regenerated battery. As shown in TABLE 1, the battery performance of the obtained battery was 75,000 mAh in battery capacity and 10.4 mΩ in internal resistance, which were respectively close to the initial performance. Thus, the battery performance was sufficiently regenerated and restored. The capacity regeneration rate was infinity %.

Embodiment 17:

A nickel-hydrogen battery similar to that of Embodiment 6 was repeatedly charged and discharged with 1C—1C at room temperature to deteriorate the battery. The capacity of the deteriorated battery was 250 mAh, and the internal resistance thereof was 140.2 mΩ.

Then, the deteriorated battery was subjected to the treatment which was identical to that of Embodiment 1 except that only the step ($A_2$) was performed, thereby obtaining a regenerated battery. As shown in TABLE 1, the battery performance of the obtained battery was 1,800 mAh in battery capacity and 8.9 mΩ in internal resistance, which were respectively close to the initial performance. Thus, the battery performance was sufficiently regenerated and restored. The capacity regeneration rate was 620%.

TABLE 1

| Embodiment | RECYCLING STEP | | | | |
|---|---|---|---|---|---|
| | 1 $B_1$ | 2 $B_2$ | 3 C | 4 $A_1$ | 5 $A_2$ |
| 1 | ○ | ○ | ○ | ○ | ○ |
| 2 | ○ | ○ | ○ | ○ | ○ |
| 3 | ○ | ○ | ○ | ○ | ○ |
| 4 | ○ | ○ | ○ | ○ | ○ |
| 5 | ○ | ○ | ○ | ○ | ○ |
| 6 | ○ | ○ | ○ | ○ | ○ |
| 7 | ○ | ○ | ○ | ○ | ○ |
| 8 | ○ | ○ | ○ | ○ | ○ |
| 9 | ○ | ○ | ○ | ○ | ○ |
| 10 | ○ | ○ | ○ | ○ | ○ |
| 11 | ○ | — | ○ | ○ | ○ |
| 12 | ○ | — | ○ | — | ○ |
| 13 | — | ○ | ○ | ○ | ○ |
| 14 | ○ | — | — | — | ○ |
| 15 | ○ | — | — | — | ○ |
| 16 | — | ○ | — | — | ○ |
| 17 | — | — | — | — | ○ |

| Embodiment | battery capacity (mAh) | | |
|---|---|---|---|
| | initial time | when deteriorated | after regenerated |
| 1 | 95,000 | 74,500 | 92,000 |
| 2 | 95,000 | 10,000 | 82,000 |
| 3 | 7,000 | 6,800 | 6,820 |
| 4 | 7,000 | 6,950 | 6,950 |
| 5 | 4,500 | 2,200 | 4,200 |
| 6 | 2,300 | 890 | 2,010 |
| 7 | 1,100 | 0 | 950 |
| 8 | 95,000 | 12,000 | 85,300 |
| 9 | 95,000 | 59,300 | 78,500 |
| 10 | 7,000 | 5,800 | 6,530 |
| 11 | 7,000 | 5,920 | 6,580 |
| 12 | 4,500 | 1,238 | 4,200 |
| 13 | 95,000 | 45,000 | 87,000 |
| 14 | 95,000 | 42,000 | 65,000 |
| 15 | 95,000 | 75,000 | 89,000 |
| 16 | 95,000 | 0 | 75,000 |
| 17 | 2,300 | 250 | 1,800 |

| Embodiment | internal resistance (mΩ) | | | capacity regeneration rate (%) |
|---|---|---|---|---|
| | initial time | when deteriorated | after regenerated | |
| 1 | 6.5 | 10.2 | 6.6 | 23.5 |
| 2 | 6.5 | 53.2 | 9.2 | 720 |
| 3 | 3.0 | 10.5 | 3.2 | 0.3 |
| 4 | 3.0 | 12.1 | 3.3 | 0 |
| 5 | 8.5 | 18.2 | 8.6 | 90.1 |
| 6 | 6.0 | 45.0 | 6.1 | 125.8 |
| 7 | 8.2 | ∞ | 9.2 | ∞ |
| 8 | 6.5 | 112.5 | 10.2 | 610.8 |
| 9 | 6.5 | 23.3 | 10.2 | 32.4 |
| 10 | 3.0 | 102.4 | 4.5 | 12.6 |
| 11 | 3.0 | 114.3 | 4.4 | 11.1 |
| 12 | 8.5 | 145.4 | 10.2 | 239.6 |
| 13 | 6.5 | 98.4 | 15.2 | 93.3 |
| 14 | 6.5 | 157.3 | 12.3 | 54.8 |
| 15 | 6.5 | 15.3 | 7.2 | 18.7 |
| 16 | 6.5 | ∞ | 10.4 | ∞ |
| 17 | 6.0 | 140.2 | 8.9 | 620 |

(○: perform —: not perform)

As is apparent from the preceding embodiments, with the recycling method in accordance with the present invention, the charging and discharging property of the deteriorated nickel-hydrogen battery is restored, thereby enabling the regeneration and recycling thereof.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of recycling a nickel-hydrogen battery, comprising:

at least one of step ($A_1$) of pouring a new alkali electrolyte into the nickel-hydrogen battery, and step ($A_2$), which is conducted after step ($A_1$), of exhausting a liquid in the nickel-hydrogen battery and pouring a new alkali electrolyte thereinto.

2. A method of recycling a nickel-hydrogen battery according to claim 1, wherein said new alkali electrolyte contains a reducing agent.

3. A method of recycling a nickel-hydrogen battery comprising:

at least one of the step ($B_1$) of pouring concentrated sulfuric acid which contains at least one of nickel ions, cobalt ions and lanthanum ions into the nickel-hydrogen battery to clean the interior thereof at room temperature, and the step ($B_2$) of pouring concentrated sulfuric acid which contains at least one of nickel ions, cobalt ions and lanthanum ions into the nickel-hydrogen battery and maintaining the state of the interior of the battery at a temperature of 60±10° C.; and at least one of the step ($A_1$) of pouring a new alkali electrolyte into the nickel-hydrogen battery, and the step ($A_2$) of exhausting a liquid in the nickel-hydrogen battery and pouring a new alkali electrolyte thereinto.

4. A method of recycling a nickel-hydrogen battery according to claim 3, wherein the step ($A_2$) is carried out after the step ($A_1$) is carried out.

5. A method of recycling a nickel-hydrogen battery according to claim 3, wherein said new alkali electrolyte contains a reducing agent.

6. A method of recycling a nickel-hydrogen battery according to claim 3, wherein at least one of the step ($A_1$) and the step ($A_2$) is carried out after at least one of step ($B_1$) and the step (B 2) is carried out repeatedly at least three times.

7. A method of recycling a nickel-hydrogen battery according to claim 3, wherein the time for maintaining the state of the interior of the battery at a temperature of 60±10° C. in the step ($B_2$) is at least 30 minutes.

8. A method of recycling a nickel-hydrogen battery comprising:

at least one of the step ($B_1$) of pouring concentrated sulfuric acid which contains at least one of nickel ions, cobalt ions and lanthanum ions into the nickel-hydrogen battery to clean the interior thereof at room temperature, and the step ($B_2$) of pouring concentrated sulfuric acid which contains at least one of nickel ions, cobalt ions and lanthanum ions into the nickel-hydrogen battery and maintaining the state of the interior of the battery at a temperature of 60±10° C.;

the step (C) of supplying an electric current in order to charge the nickel-hydrogen battery; and at least one of the step ($A_1$) of pouring a new alkali electrolyte into the nickel-hydrogen battery, and the step ($A_2$) of exhausting a liquid in the nickel-hydrogen battery and pouring a new alkali electrolyte thereinto.

9. A method of recycling a nickel-hydrogen battery according to claim 8, wherein the step ($A_2$) is carried out after the step ($A_1$) is carried out.

10. A method of recycling a nickel-hydrogen battery according to claim 8, wherein said new alkali electrolyte contains a reducing agent.

11. A method of recycling a nickel-hydrogen battery according to claim 8, wherein at least one of the step ($A_1$) and the step ($A_2$) is carried out after at least one of step ($B_1$) and the step ($B_2$) is carried out repeatedly at least three times.

12. A method of recycling a nickel-hydrogen battery according to claim 8, wherein the time for maintaining the state of the interior of the battery at a temperature of $60\pm10°$ C. in the step ($B_2$) is at least 30 minutes.

13. A method of recycling a nickel-hydrogen battery according to claim 12, wherein the current density in the step (C) ranges from 3 to 5 $A/dm^2$.

14. A method of recycling a nickel-hydrogen battery according to claim 12, wherein the time for supplying the electric current is 30 to 60 minutes.

* * * * *